United States Patent
Knudsen (10) Patent No.: US 8,092,173 B2
(45) Date of Patent: Jan. 10, 2012

(54) WIND TURBINE CONTROL METHOD

(75) Inventor: Jan Vestergaard Knudsen, Aarhus (DK)

(73) Assignee: Vestas Wind Systems A/S, Randers SV (DK)

( * ) Notice: Subject to any disclaimer, the term of this patent is extended or adjusted under 35 U.S.C. 154(b) by 98 days.

(21) Appl. No.: 12/780,449

(22) Filed: May 14, 2010

(65) Prior Publication Data
US 2010/0290905 A1 Nov. 18, 2010

Related U.S. Application Data

(60) Provisional application No. 61/179,126, filed on May 18, 2009.

(30) Foreign Application Priority Data

May 18, 2009 (DK) ................................ 2009 70007

(51) Int. Cl.
*F03D 7/00* (2006.01)
(52) U.S. Cl. .................. 416/1; 416/37; 416/43; 416/48; 416/61
(58) Field of Classification Search ................. 416/1, 31, 416/37, 43, 47, 48, 61
See application file for complete search history.

(56) References Cited

U.S. PATENT DOCUMENTS

| 4,189,648 A | 2/1980 | Harner |
| 4,885,676 A | 12/1989 | Zweighaft |
| 6,619,918 B1 * | 9/2003 | Rebsdorf .......................... 416/1 |
| 7,121,795 B2 | 10/2006 | Moroz et al. |

FOREIGN PATENT DOCUMENTS

| EP | 1612414 | 1/2006 |
| EP | 1719910 | 11/2006 |
| WO | WO 2009/026930 | 3/2009 |

OTHER PUBLICATIONS

Office Action issued by the Denmark Patent and Trademark Office dated Dec. 15, 2009.

* cited by examiner

*Primary Examiner* — Igor Kershteyn
(74) *Attorney, Agent, or Firm* — Wood, Herron & Evans, LLP (57) ABSTRACT

A method of controlling a wind turbine, where a control signal for a controllable parameter of the wind turbine is determined repeatedly at successive time steps, and a control history including respective control values derived from or included in past control signals is stored. These control values stored in the control history are then used to determine an alert parameter for the controllable parameter, the alert parameter being a function of the variations of the control signals over time. The wind turbine is then controlled according to the most recent control signal only if the alert parameter is below an alert threshold, and otherwise according to a modified control strategy. The control method may be performed on pitch reference signals for controlling the individual and/or collective pitch of the blades. The invention further relates to a control system configured to perform the above control method, and a wind turbine comprising such system.

21 Claims, 5 Drawing Sheets

WIND TURBINE CONTROL METHOD

This application claims priority from U.S. Provisional Patent Application Ser. No. 61/179,126 filed on May 18, 2009 and Denmark Patent Application No. PA2009 70007 filed May 18, 2009.

FIELD OF THE INVENTION

The present invention relates to a control strategy for wind turbines aimed at detecting and avoiding situations inconsistent changes in the controlling which may otherwise lead to extreme load situations on the wind turbine components.

BACKGROUND

Most modern wind turbines are controlled and regulated continuously most often with the purpose of ensuring maximum power extraction from the wind under the current wind, weather, while at the same time ensuring that the loads on the different components of the wind turbine are at any time kept within acceptable limits. Desirably, the wind turbine may also be controlled to account for fast local variations in the wind velocity—the so-called wind gusts, and take into account the dynamic changes in the loads on the individual blades due to e.g. the passing of the tower or the actual wind velocity varying with the distance to the ground (the wind profile).

To this purpose a number of parameters are collected and monitored by the controllers in a wind turbine, such as for instance the current wind speed and direction, the wind shear and turbulence, the rotational speed of the rotor, the generator, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The methods of controlling the current performance, and thereby the power production and the load situation of the wind turbine, include for instance pitching of the blades, adjusting any different active aerodynamic devices for changing the aerodynamic surfaces of the blades such as flaps or vortex generating means, adjusting the power, and/or adjusting the rotational speed of the rotor.

Multiple control strategies or ways for the controllers to interact with the wind turbine exist, and may in modern wind turbines be very complex, involving several controllers placed in different parts of the turbine and interacting to continuously determine and update the optimal values of the control parameters. The control strategies may often be based on hundreds of collected and determined parameters in trying to take all eventualities into account and cover both the common, more rare, and extreme operation scenarios.

However, even for very advanced and sophisticated control systems, imperfect or inadequate controlling may still occur for instance due to sensor errors providing the control system with incorrect data, or due to operation scenarios not foreseen or covered by the applied control strategies. Such imperfect controlling may in some control and weather situations result in very high and unacceptable loads in some of the components of the wind turbines, e.g. in the tower due to an undesirable pitching of one or more of the blades, or in the gears due to erroneous adjustments of the power. Such loads may be of considerable sizes and may in the worst case scenario in the extreme situations lead to fatal damage of the turbine. Irrespective that the probability for such extreme situations to arise may be minimal, the possible implications are unacceptable, creating the need for fail-safe control methods capable of preventing these possibly rare but extreme eventualities.

DESCRIPTION OF THE INVENTION

It is therefore an object of embodiments of the present invention to overcome or at least reduce some or all of the above described disadvantages of the known control methods for wind turbines by providing a control method reducing the risk of extreme load situations due to undesirable variations in the control parameters.

It is a further object of embodiments of the invention to provide a control strategy which may be fast and simple to implement in existing control strategies, and yet effective.

In accordance with the invention this is obtained by a method of controlling a wind turbine, comprising the steps of determining a control signal for a controllable parameter of the wind turbine, repeating the step of determining the control signal at successive time steps, and storing a control history including one or more respective control values derived from or included in past control signals. Further the method comprises using the control values stored in the control history to determine an alert parameter for the controllable parameter, where the alert parameter is a function of the variations of the control signals over time. The wind turbine is then controlled according to the most recent control signal only if the alert parameter is below an alert threshold and according to a modified control strategy if the alert parameter is above the alert threshold.

As briefly mentioned in the introduction, the controllable parameter may for instance comprise the individual or collective pitching of the blades, the yaw, or coning of the rotor, the rotational speed of the rotor, the power, the generator speed, or some adjusting parameters for any different active aerodynamic devices for changing the aerodynamic surfaces of the blades such as flaps or vortex generating means.

The control method according to the invention hence comprises a control signal supervision strategy for avoiding extreme load situations of a wind turbine, where the control signals from a controller are continuously supervised and the changes in the control signals from each sample or time step to a previous are registered. If the change in the control signal is above a certain limit for a predefined number of time steps in a row, the turbine is controlled differently, for instance by being stopped.

The hereby obtained control method is advantageous in acting as a fail-safe system catching in an simple yet effective way reoccurring large changes or variations in the controlling, which are undesirable because such changes or fluctuations may otherwise lead to extreme load situations in different wind turbine components such as the tower, the blades, the generator, the gears etc. In worst case scenarios such extreme loads may result in fatal damage of the wind turbine, as e.g. ultimately result in breaking of the tower, and are therefore unacceptable. The supervision according to the control strategy ensures in a simple yet effective manner that the risk of extreme load situations is greatly reduced or even avoided by overruling the controlling otherwise decided on, and by following a modified control strategy instead in the case of multiple too high changes in the control parameter of concern, e.g. by derating or shutting down the wind turbine completely.

This is achieved by the control method taking into consideration historical changes of the control signals and deducting from these the alert parameter based on which the following control strategy may be changed.

As the control method only affects or intervenes in the otherwise intended control of the wind turbine in the rare cases of the multiple too high changes in the control parameter of concern, the control method is fast and robust. Also, the control method is simple and inexpensive to implement and may be implemented in existing control strategies as an add-on.

Further, as the supervision is performed on the control reference signals and not based on measured parameters, any intervention is performed prior to the critical control signals being applied, thereby avoiding the extreme loads otherwise possibly resulting from the intended control.

On the other hand, the control algorithm may be not over sensitive in the sense that it only reacts to large variations of the control signals occurring repeatingly. In this way the control strategy is not changed simply because of only a few (below the alert threshold value) deflections in the control signals.

The control values stored in the control history according to the invention, and from which the alert parameter is then determined, may comprise the control signals themselves from each time step. Alternatively, or in addition hereto the variation of the control signals from time step to time step may be stored as control values. A further possibility is to store the current value of the alert parameter at each time step (optionally as an entry into a log), along with the most recent acceptable control signal.

By storing only the alert parameter and the most recent acceptable control signal is obtained a very simple, fast, and robust control method with minimum storage requirements and calculations in each time step. By storing the information on the control signals in the control history is obtained the possibility of letting the alert parameter be a more complex function of the control signals in the control history, such as depending on for instance the second derivatives of the control signals. The alert parameter may be a function of only the variations of the control signals over time or may in another embodiment be a function of the control signal itself, e.g. on the present pitch reference. The alert parameter may further depend on other parameters such as e.g. the wind speed, acceleration signals, measured loads (especially blade loads), pitch angles, or the power production.

The control signal may in one embodiment of the invention comprise a power or torque reference signal for controlling the rotational speed of the wind turbine rotor by changing the power or torque. Hereby undesirable large successive variations in the power signals may be effectively avoided reducing the risk of otherwise possible large loads primarily in the gears, the generator, and in the electrical systems of the wind turbine.

The control signal may in a further embodiment of the invention comprise a pitch reference signal for controlling the pitching of the blades of the wind turbine. The pitch reference signal may comprise the value of the pitch reference for each individual wind turbine blade, and/or the value of the collective pitch reference, so that the control method may be performed on each of the individual blade pitch references and/or on the mean (the collective pitch reference) of these. By using the pitch reference signals in the control supervision instead of the actual measured pitch angles of the blades is obtained that the control of the wind turbine is modified (e.g. stopped) prior to the critical pitch signals being carried out instead of only reacting to already executed pitch values. In this way the modification of the control is applied earlier and possible extreme loads on some of the wind turbine components avoided. Large successive variations in the pitch may result in large undesirable or even fatal loads in especially the tower and the blades,—loads which in a worst case scenario may be so large that they can result in breaking of the tower.

The modified control strategy may in one embodiment of the invention comprise stopping the wind turbine whereby the undesirable large variations in the control signals are effectively and in a simple way stopped and any extreme loads prevented. Stopping may be achieved e.g. gradually or step wise slowing the turbine down to a halt, or by pitching the blades completely out of the wind.

Further, the modified control strategy may in another embodiment of the invention comprise controlling the wind turbine according to the control signal prior to the most recent control signal, whereby the wind turbine is controlled in a safe mode and the undesirable large variations in the control signals are effectively prevented without largely influencing the productivity of the wind turbine.

In an embodiment of the invention, the alert threshold is a predefined constant, may depend on the most recent control value, and/or may depend on the wind speed.

The alert threshold may be chosen differently depending on the parameters to be controlled and reflecting how fast the system for actually performing the change in the parameter is. By way of example, the pitch system in many wind turbines may be a relatively slow reacting system. Here, the time needed to pitch the blades may be considerably longer than the time steps between successive samples from the pitch controller. Hence, the blades may often not have reached the pitch angle according to the pitch signal before a new pitch signal is received. Other control systems such as the power control are much faster. Therefore, the alert threshold may for some controllable parameters (as e.g. the pitch) be chosen relatively high, such as for example between 3-10, allowing for a correspondingly number of large successive variations in the control history before a modified control strategy is applied, whereas the alert threshold for the power control may be relatively low, such as for example between 2-5, allowing correspondingly few large successive changes before the control method reacts by changing the control strategy.

The alert threshold may optionally be a function of the other parameters such as e.g. the current wind speed, a turbulence factor, acceleration measurements on the nacelle or the blades, the blade loads, the power production, the generator speed, or the current pitch of the blades, whereby is obtained that the control method in some situations reacts more promptly to large variations in the control signals. In this way a more conservative control strategy may be applied in situations where the consequences of the large variations are more severe, for instance at higher wind speeds or if the blades are pitched out around 15-20° degrees out.

According to one embodiment of the invention, the control history may comprise at least the three most recent control values in which case the historical changes in the last at least three previous time steps are taken into account in the control strategy thereby yielding a more robust control. On the other hand not the complete history of control values needs to be stored, but only rather relatively few previous control values, which is advantageous out of storage considerations.

According to further embodiment of the invention, the variations of the control signals are determined as the differences between successive control signals, whereby the changes from time step to time step are taken into account in the control method.

The variations of the control signals may in another embodiment be evaluated relative to a predefined upper signal change limit $\Delta\theta_{pos}$ and a predefined lower signal change limit $\Delta\theta_{neg}$. These signal change limits are set as limits differentiating the changes in the control signals considered acceptable from those considered too large if taking place too many times in successive time steps. Changes in the control signals may in some cases be more critical if occurring in one direction rather than in the other which may be reflected by defining the upper and lower signal change limits to of different size numerically.

The method of controlling according to the invention may further comprise the steps of determining a most recent acceptable control signal as the most recent control signal in the time sequence being changed neither above the upper signal change limit $\Delta\theta_{pos}$ nor below the lower signal change limit $\Delta\theta_{neg}$ relative to the previous acceptable control signal, and determining the variations of a control signal as the difference between the control signal and the most recent acceptable control signal at that time step.

The acceptable control signal is in this way determined as the last control signal in the time sequence not being changed beyond the upper and lower signal change limits $\Delta\theta_{pos}$ and $\Delta\theta_{neg}$ relative to the previous acceptable control signal.

By determining the variations of the control signals relative to the last acceptable control signal instead of always relative to the previous control signal, situations of the control signal being changed beyond the change limits once and then slowly drifting from there without returning to an acceptable value can be caught and reacted to.

The method of controlling may in a further embodiment comprise the steps of determining the difference between the most recent control signal and the most recent acceptable control signal, and increasing the alert parameter one level if this difference falls outside the range from the lower signal change limit $\Delta\theta_{neg}$ to the upper signal change limit $\Delta\theta_{pos}$ or initializing the alert parameter if said difference falls within the range from the lower signal change limit $\Delta\theta_{neg}$ to the upper signal change limit $\Delta\theta_{pos}$.

Hereby the alert parameter in a simple way reflects the number of successive unacceptable changes in the most recent control signals. In this way the previous control signals need not be stored in the control history as the variations hereof are evaluated on a step by step basis yielding an effective and simple control algorithm with only low storage requirements.

The whole control method may in one embodiment be performed in the same controller such as the hub or the top controller. Alternatively, different steps of the method may be performed in different controllers. In one embodiment of the invention, the control signals are received from a hub controller whereby the control signals (e.g. the pitch references) may be monitored at every sample. In a further embodiment, the control signal is determined in a first controller, whereas the determinations of the variations of the control signals are performed in a second controller separate from the first.

By implementing the supervision strategy in a different controller than the hub controller, this second controller is able to perform the control strategy according to the invention, by-pass the hub controller, and shut down the turbine even in the rare case that the hub controller has crashed. A greater safety is hence obtained.

Another aspect of the invention relates to a control system for a wind turbine is configured to perform the steps of determining a control signal for a controllable parameter of the wind turbine; repeating the step of determining the control signal at successive time steps, and storing a control history including one or more respective control values derived from or included in past control signals; using the control values stored in the control history to determine an alert parameter for said controllable parameter, the alert parameter being a function of the variations of the control signals over time; controlling the wind turbine according to the most recent control signal only if the alert parameter is below an alert threshold, and controlling the wind turbine according to a modified control strategy if the alert parameter is above the alert threshold.

The invention further relates to a wind turbine comprising such a control system.

The advantages of the above control system and wind turbine are as describes in relation to the method.

In one embodiment the wind turbine according to the above may comprise a first controller in which the step of determining the control signal for the controllable parameter of the wind turbine is performed, and a second controller configured to receive the control signal from the first controller and to determine the alert parameter. By placing the supervision of the control signals in another controller than the controller determining the control signals is obtained that the supervision is independent on whether the first controller has crashed or not. Hence, the second controller would be able to by-pass the first controller and derate or shut down the wind turbine if necessary.

BRIEF DESCRIPTION OF THE DRAWINGS

In the following different embodiments of the invention will be described with reference to the drawings, wherein:

FIGS. 4 and 5 illustrate two examples of different control signal histories and the control strategy resulting there from.

DETAILED DESCRIPTION OF THE DRAWINGS

Figure 1:
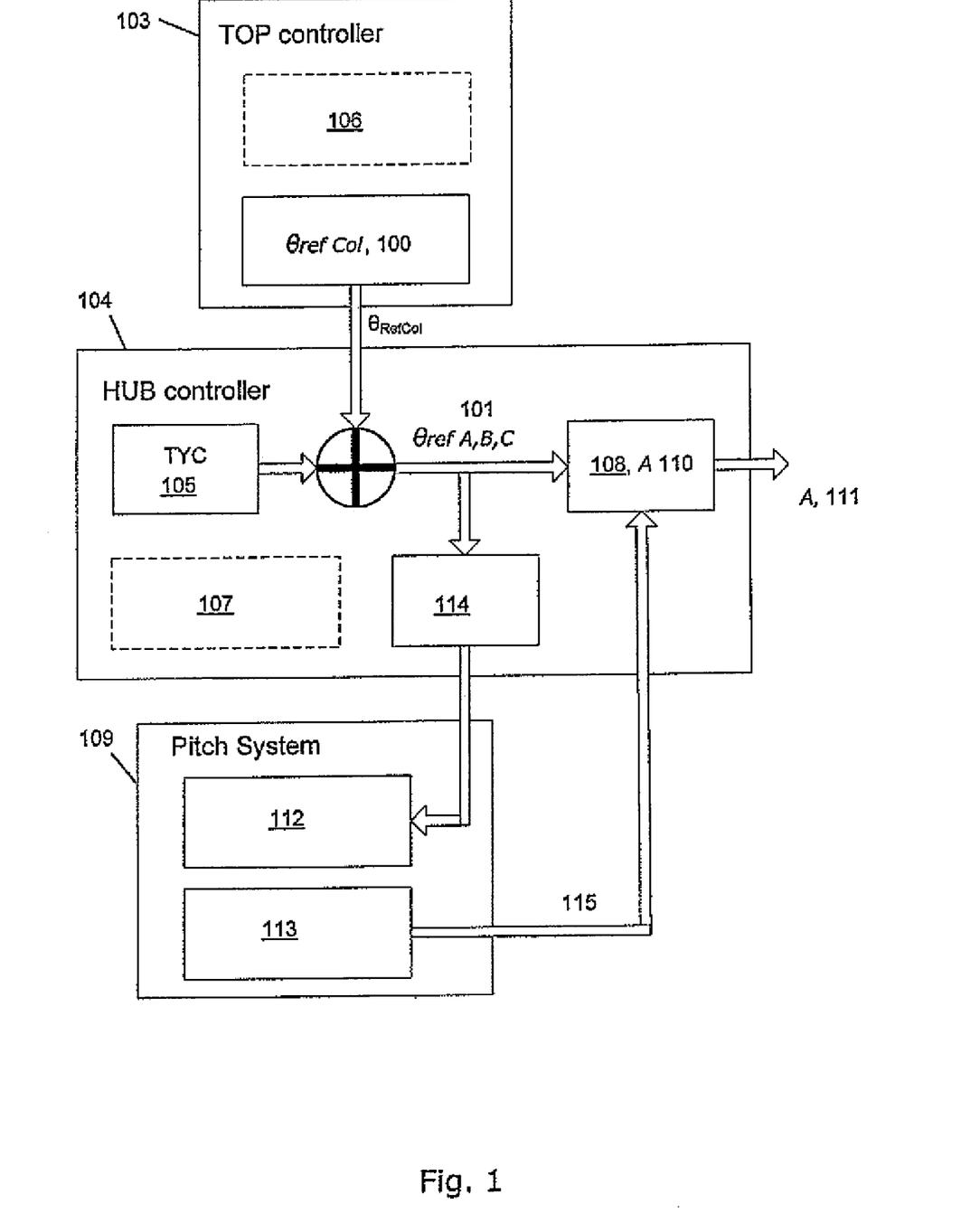
FIG. 1 shows an overview of the control strategy on supervising the pitch signals according to an embodiment of the invention as implemented in a wind turbine.

FIG. 1 gives an overview of how the control method of supervising the critical control parameters may in one embodiment be implemented in the control system of a wind turbine. In the shown example, the controllable parameter of the wind turbine being supervised is the blade pitch and the control signals hence comprise the collective pitch reference $\theta_{RefCol}$ 100, which is a common pitch parameter for all the blades and being equal to the mean of the individual pitch reference parameters for the individual blades, $\theta_{RefA}$, $\theta_{RefB}$, and $\theta_{RefC}$, 101. The collective pitch reference $\theta_{RefCol}$ 100 is determined in the top controller 103. Using this collective pitch reference 100 and based on tilt-yaw calculations TYC, 105, the pitch reference parameters for the individual blades, $\theta_{RefA}$, $\theta_{RefB}$, and $\theta_{RefC}$, 101 are determined in the hub controller 104. Both the top controller 103 and the hub controller 104 may comprise other controller blocks 106, 107, in addition to the blocks 100, 105 making the collective pitch calculations and the tilt-yaw calculations. The control strategy according to an embodiment of the invention then is performed on the pitch reference parameters in the controller block 108 in the hub controller 104, where the alert parameter A, 110 is determined as a function of the present and past control signals and their variation in time. The otherwise determined control signals comprising the collective and individual pitch references 100, 101 are only changed or modified if the alert parameter A, 110 is above a certain alert threshold in which case an alarm is triggered and the wind turbine, according the present embodiment of the invention, is stopped, 111.

Otherwise, if the alert threshold is not exceeded, the control signals including the pitch references (which may have been converted to pitch valves set points 114 already in the hub controller 104) are sent to the pitch system 109 which comprises the pitch valves system 112. This is then operated according to the control signals. In case the emergency valves 113 in the pitch system 109 are already active (if for example an emergency feathering is being applied), the system will not trigger any alarm regardless of the size of the alert parameter A, 110 as indicated by the arrow 115.

Figure 2A:
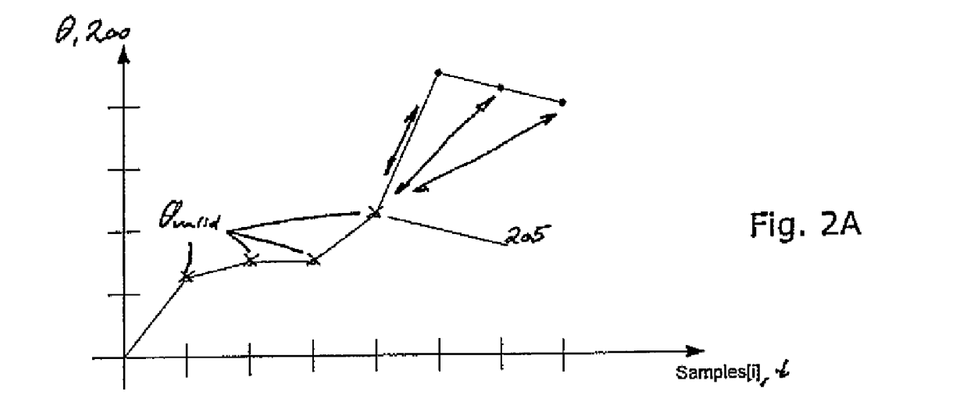
FIG. 2 illustrates an example of a control signal history and the control strategy according to an embodiment of the invention.
Figure 2B:
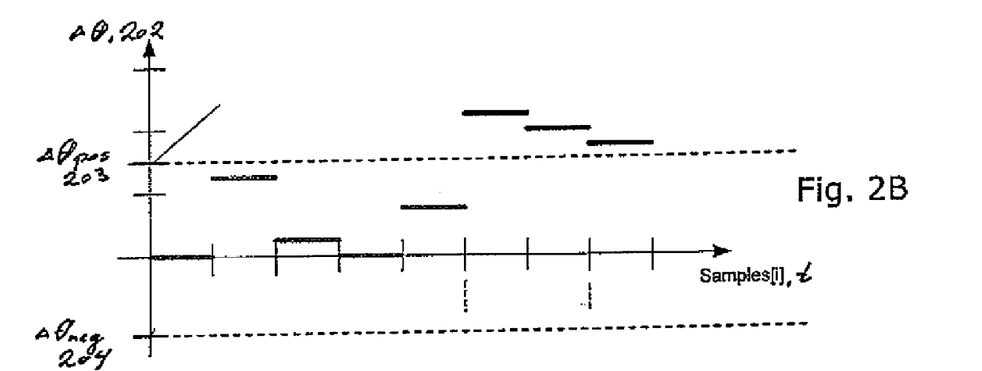
Figure 2C:
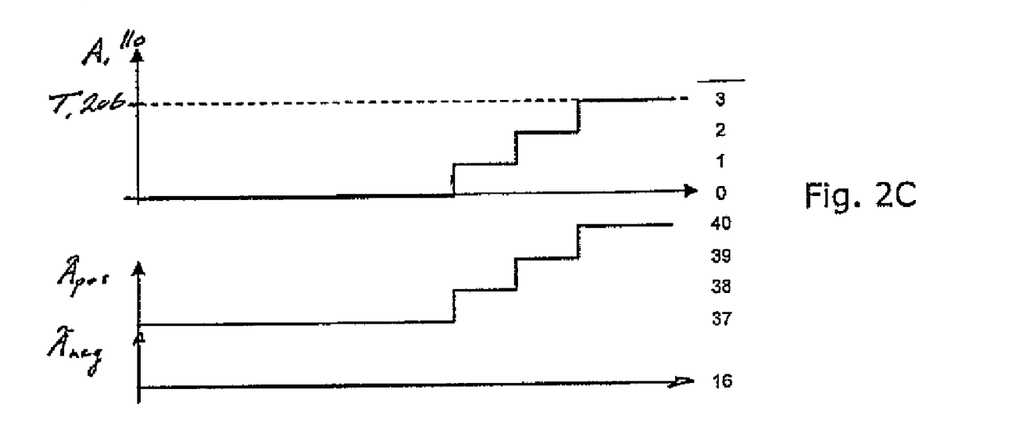

An example of a control signal history and the hereof resulting control strategy according to an embodiment of the invention is illustrated in the FIGS. 2A, B, and C. The curve in FIG. 2A shows a control history of a control signal θ, 200 which may be or comprise e.g. a pitch reference parameter. The control signals determined at different samples or time steps are shown as a function of the sample number or time, t, 201. In FIG. 2B is shown the variations of the control signals Δθ, 202. The variation is in this embodiment determined as the difference between a control signal θ at one sample or time step and the last or most recent acceptable control signal $θ_{valid}$ prior to that time step. A control signal is considered acceptable or valid, if the control signal has not changed beyond the predefined upper and lower change limits $Δθ_{pos}$ and $Δθ_{neg}$, respectively, relative to the foregoing acceptable control signal. The variations in this embodiment hence are equal to the difference from one control signal to the next as long as the control signal is not changed excessively. In an embodiment of the invention, the upper and lower change limits may be variable and may be the same or different functions on the present or one or more foregoing control signals. In this way larger variations may be acceptable depending on from what the control signal is changed.

In the present example and as can be seen from the control signals in FIG. 2A and the calculated variations in FIG. 2B, the first four control signals (marked with crosses) are all acceptable, as they have been changed neither above the upper change limits $Δθ_{pos}$, 203 nor below the lower change limits $Δθ_{neg}$, 204. The control signal marked 205 in FIG. 2A is therefore the last acceptable control signal $θ_{valid}$ for the shown samples or time steps. Each time the variation of the control signal exceeds the upper or lower change limits, $Δθ_{pos}$ or $Δθ_{neg}$, the alert parameter A, 110 is increased one level as depicted in FIG. 2C. When the alert parameter reaches or exceeds a certain alert threshold T, 206, which in the present example is sat to 3, the present control strategy is overruled, and the wind turbine is no longer controlled according to the determined control signals but rather according to a modified control strategy. Such modified control strategy may comprise stopping the wind turbine or maintaining the control as determined in an earlier sample, e.g. not changing the pitch angles. As illustrated in the two lowermost curves in FIG. 2C, the control method may furthermore keep track on, how many times the upper and lower change limits $Δθ_{pos}$, 203; $Δθ_{neg}$, 204, respectively have been exceeded for statistical purposes, and yielding information on which changes in the control signals are the predominant.

The size of the alert threshold reflects how many very deviating control signals are acceptable without having to react and change the control strategy. This parameter also depends on the type of control parameter being controlled. For instance in the case of pitch control, the pitch system is a relatively slow reacting system and the blades may therefore often not have reached the desired pitch angle as given by the pitch reference signal before a new control sample is performed and a new control signal is sent to the pitch system. Therefore, three or even more relatively large successive variations in the pitch reference control signals may not be critical for the turbine, as samples are performed on much faster time scale than the pitching itself. The power control on the other hand may be a promptly reacting system. Therefore, large changes in the control signals are more crucial to the control of the power, which then may be reflected in the control method according the invention by setting a relatively low threshold parameter whereby only relatively few large variations in the control signals are allowed to take place before a modified control strategy is applied.

Figure 3:
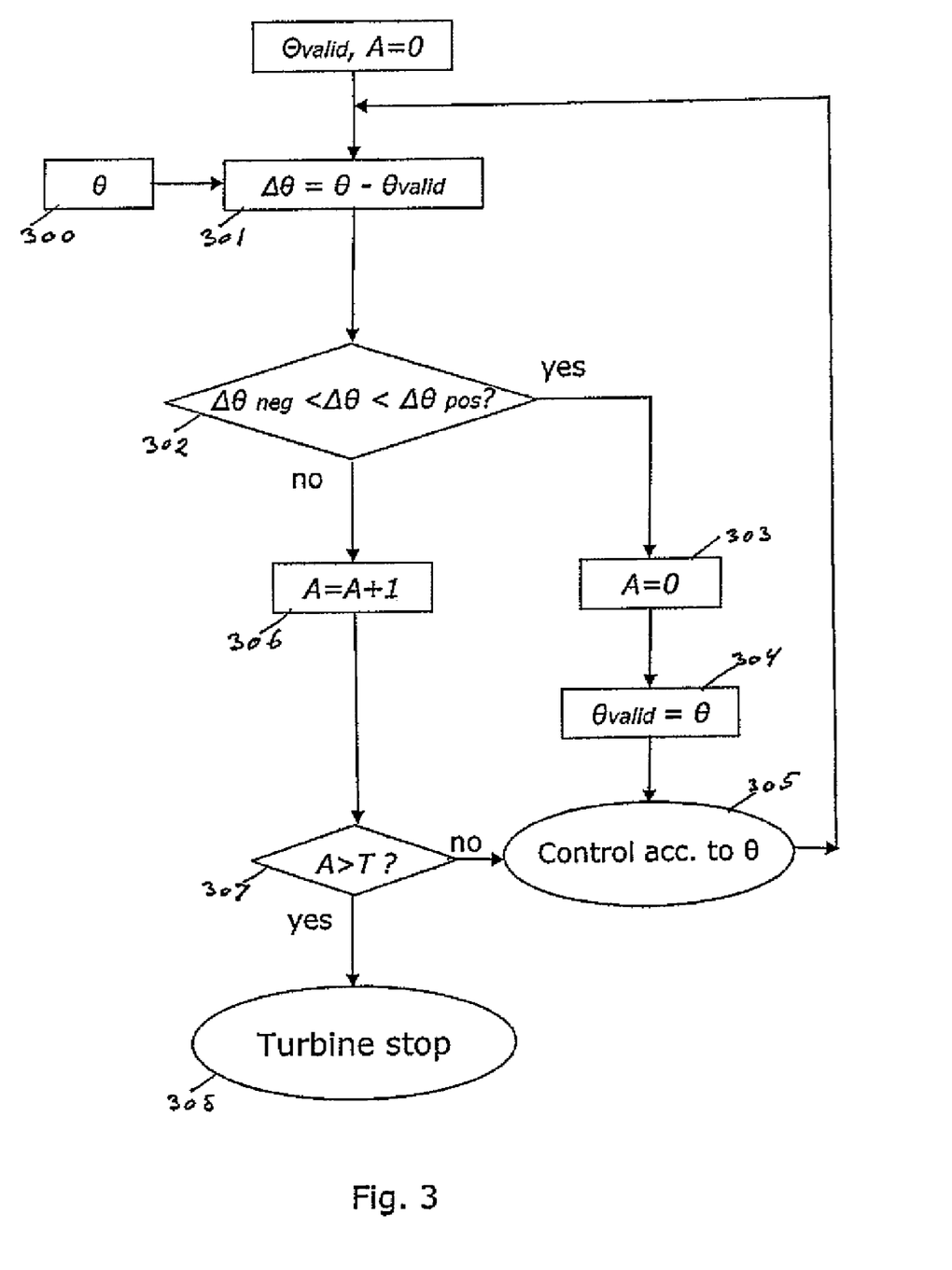
FIG. 3 is a flow-chart illustrating an embodiment of the control strategy.

The control method according to the invention is illustrated step-by-step in the flowchart in FIG. 3 and as applied to a pitch control parameter. As before, the principle is however the same for other controllable parameters such as for control signals comprising the power reference etc. In each time step and for each sample, a new control signal θ is received from another controller or determined locally, 300. The difference Δθ between this most recent control signal θ and the most recent acceptable control signal $Δθ_{valid}$ is then determined, $Δθ=θ−θ_{valid}$ in the step 301, and evaluated relative to the upper and lower change limits $Δθ_{pos}$, $Δθ_{neg}$, respectively, 302. In case the variation of the control signal falls inside these limits, $Δθ_{neg}<Δθ<Δθ_{pos}$, the alert parameter A is initialized, 303, the control signal becomes the most recent acceptable control signal, θvalid=θ, 304, and the wind turbine is controlled according to the control signal θ 305 without any intervention.

If, on the other hand, the change in control signal falls outside the upper and lower change limits, $Δθ_{neg} \geq Δθ$, or $Δθ \geq Δθ_{pos}$, then the alert parameter A is increased one level, 306. No actions are taken if the alert parameter is still lower than the alert threshold T, 307, in which case the wind turbine is still controlled according to the control signal θ, 305 without any modifications. In case the alert threshold is exceeded, the present control strategy is overruled and the wind turbine is controlled according to a modified control strategy, 308. The modified control strategy may as previously mentioned for instance involve stopping the wind turbine, slowing the wind turbine down, or continue to control the wind turbine according to the previous or an even earlier control signal.

The control method may involve using the control signals as control values being stored in each time step and from which the alert parameter is then determined as a function of a number of the most recent control signals. Alternatively, or in addition hereto the variation of the control signals from time step to time step may be stored as the control values. A further possibility is to simply store the current alert parameter, optionally as an entry into a log, and the most recent acceptable control signal which is continuously updated as described above. By storing the information on the control signals in the control history is obtained the possibility of letting the alert parameter be a more complex function of control signals in the control history, such as depending on for instance the second derivatives of the control signals. By storing only the alert parameter and the most recent acceptable control signal is obtained a very simple, fast, and robust control method with minimum storage requirements and calculations in each time step.

Figure 4A:
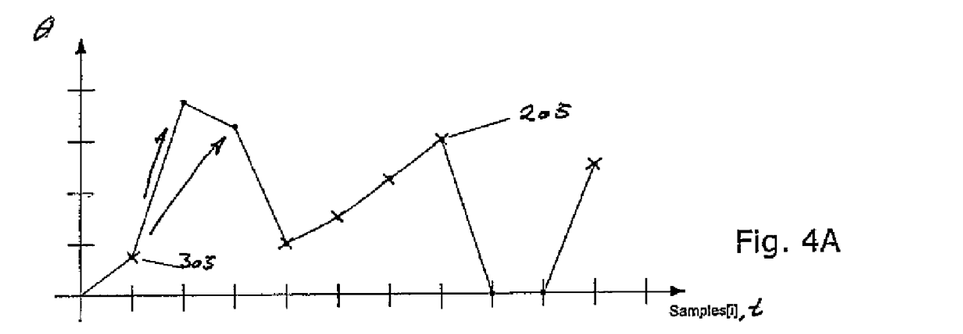
Figure 4B:
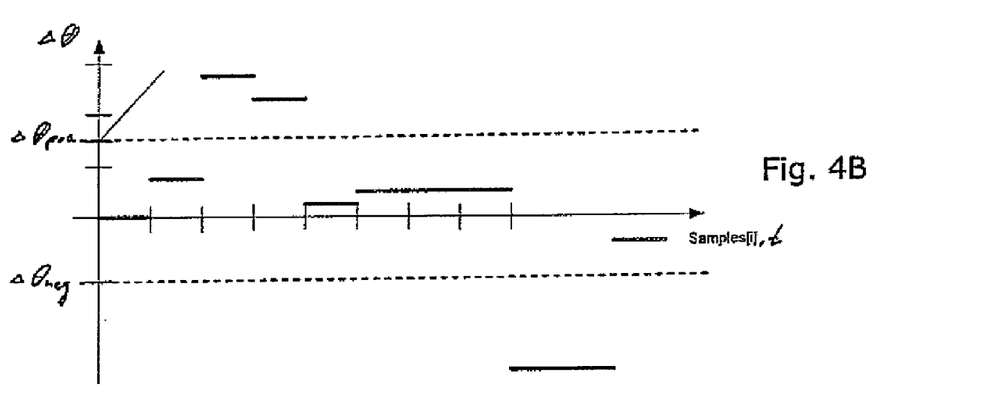
Figure 4C:
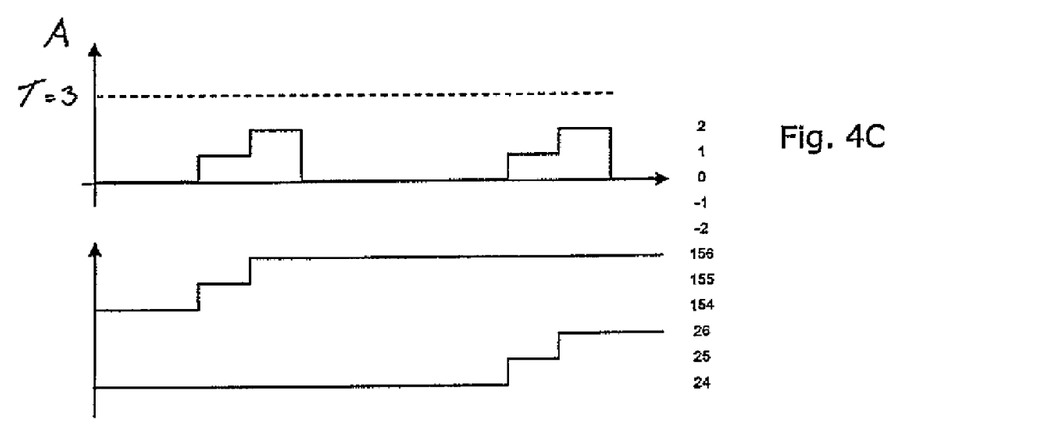
Figure 5A:
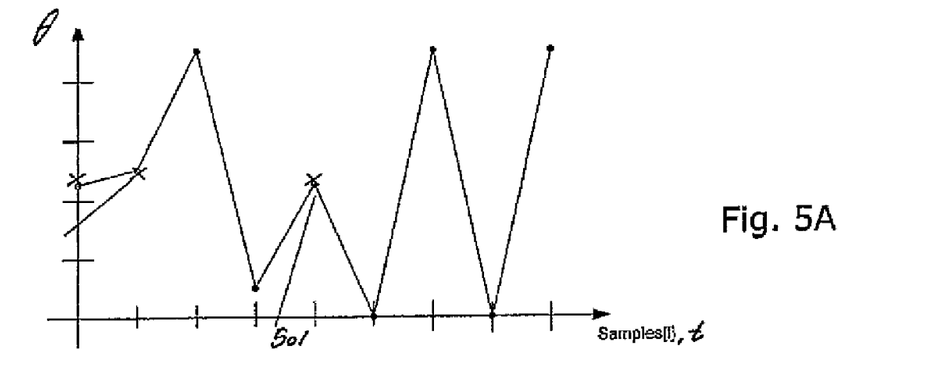
Figure 5B:
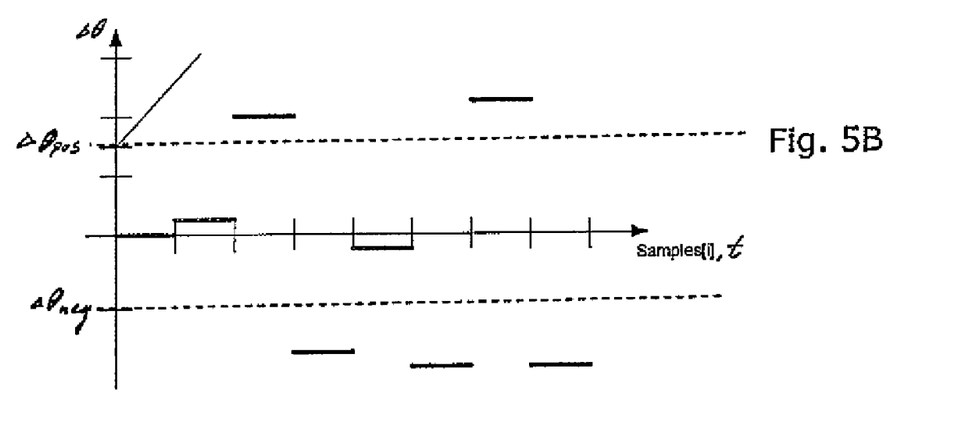
Figure 5C:
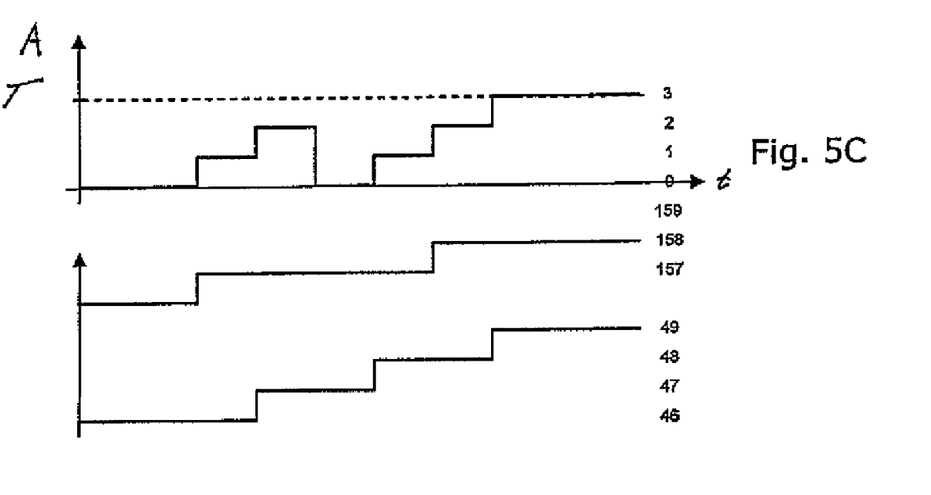

FIGS. 4 and 5 show different examples of control history values and the resulting control strategy. Similar to FIG. 2A, a control history of control reference signals as a function of the sample number and in successive time steps are depicted in FIGS. 4A and 5A, the variations of which are plotted in the FIGS. 4B and 5B and the there from resulting entries in the alert log and evolution of the alert parameter in the FIGS. 4C and 5C.

The control history in FIG. 4 is an example of a series of control signals which changes too much relative to both the chosen upper and lower change limits 203, 204, but is allowed to do so a number of times without triggering the alarm and activating the modified control strategy as the control signals do not continue to deviate too much or drift away from the acceptable control signals, 205. As can be seen from FIG. 4 C, the alert parameter A 110 does not reach or exceed the alert threshold T, 206.

This is not the case for the control history shown in FIG. 5A. This series of control signals represents a series of signals fluctuating from time step to time step. The upper and lower change limits 203 and 204 are exceeded twice in a row but the following control signal 501 is acceptable causing the alert parameter A, 110 to be initialized. However, the following three changes in the control signals again fall outside the change limits causing the alert parameter to reach the alert threshold and the wind turbine to be from then on controlled according to a modified control strategy.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, comprising the steps of:
   determining a control signal for a controllable parameter of the wind turbine;
   repeating the step of determining the control signal at successive time steps, and storing a control history including one or more respective control values derived from or included in past control signals;
   using the control values stored in the control history to determine an alert parameter for said controllable parameter, the alert parameter being a function of the variations of the control signals over time;
   controlling the wind turbine according to the most recent control signal only if the alert parameter is below an alert threshold, and
   controlling the wind turbine according to a modified control strategy if the alert parameter is above the alert threshold.

2. The method of controlling according to claim 1, where the control signal comprises a power or torque reference signal for controlling the rotational speed of the wind turbine rotor by changing the power or torque.

3. The method of controlling according to claim 1, where the control signal comprises a pitch reference signal for controlling the pitching of the blades of the wind turbine.

4. The method of controlling according to claim 1, where the modified control strategy comprises stopping the wind turbine.

5. The method of controlling according to claim 1, where the modified control strategy comprises controlling the wind turbine according to the control signal prior to the most recent control signal.

6. The method of controlling according to claim 1, where the alert threshold is a predefined constant.

7. The method of controlling according to claim 1, where the alert threshold depends on the most recent control value.

8. The method of controlling according to claim 1, where the alert threshold depends on the wind speed.

9. The method of controlling according to claim 1, where the control history comprises at least the three most recent control values.

10. The method of controlling according to claim 1, where the variations of the control signals are determined as the differences between successive control signals.

11. The method of controlling according to claim 1, where the variations of the control signals are evaluated relative to a predefined upper signal change limit $\Delta\Theta_{pos}$ and a predefined lower signal change limit $\Delta\Theta_{neg}$.

12. The method of controlling according to claim 11, further comprising the step of
   determining a most recent acceptable control signal as the most recent control signal in the time sequence being changed neither above the upper signal change limit $\Delta\Theta_{pos}$ nor below the lower signal change limit $\Delta\Theta_{neg}$ relative to the previous acceptable control signal, and
   determining the variations of a control signal as the difference between the control signal and the most recent acceptable control signal at that time step.

13. The method of controlling according to claim 1, further comprising the steps of
   determining the difference between the most recent control signal and the most recent acceptable control signal, and
   increasing the alert parameter one level if said difference falls outside the range from the lower signal change limit $\Delta\Theta_{neg}$ to the upper signal change limit $\Delta\Theta_{pos}$.

14. The method of controlling according to claim 1, further comprising the steps of
   determining the difference between the most recent control signal and the most recent acceptable control signal, and
   initializing the alert parameter if said difference falls within the range from the lower signal change limit $\Delta\Theta_{neg}$ to the upper signal change limit $\Delta\Theta_{pos}$.

15. The method of controlling according to claim 3, where the pitch reference signal comprises the value of the pitch reference for each individual wind turbine blade.

16. The method of controlling according to claim 3, where the pitch reference signal comprises the value of the collective pitch reference.

17. The method of controlling according to claim 1, where the control signals are received from a hub controller.

18. A control system for a wind turbine, the control system comprising:
   at least one controller configured to:
   determine a control signal for a controllable parameter of the wind turbine;
   repeat the step of determining the control signal at successive time steps, and store a control history including one or more respective control values derived from or included in past control signals;
   use the control values stored in the control history to determine an alert parameter for said controllable parameter, the alert parameter being a function of the variations of the control signals over time;
   control the wind turbine according to the most recent control signal only if the alert parameter is below an alert threshold; and
   control the wind turbine according to a modified control strategy if the alert parameter is above the alert threshold.

19. The control system according to claim 18, wherein the at least one controller comprises:
   a first controller configured to determine the control signal for the controllable parameter of the wind turbine, and a second controller configured to receive the control signal from said first to controller and to determine the alert parameter.

20. A wind turbine comprising:
a control system including:
at least one controller configured to:
determine a control signal for a controllable parameter of the wind turbine;
repeat the step of determining the control signal at successive time steps, and store a control history including one or more respective control values derived from or included in past control signals;
use the control values stored in the control history to determine an alert parameter for said controllable parameter, the alert parameter being a function of the variations of the control signals over time;
control the wind turbine according to the most recent control signal only if the alert parameter is below an alert threshold; and
control the wind turbine according to a modified control strategy if the alert parameter is above the alert threshold.

21. The wind turbine according to claim 20, wherein the at least one controller comprises:
a first controller configured to determine the control signal for the controllable parameter of the wind turbine, and
a second controller configured to receive the control signal from said first to controller and to determine the alert parameter.

* * * * *